United States Patent [19]
Brady

[11] 3,797,056
[45] Mar. 19, 1974

[54] AMPHIBIOUS VEHICLE

[76] Inventor: William Jackson Brady, R. R. No. 3, Thunder Bay, Ontario, Canada

[22] Filed: Oct. 25, 1972

[21] Appl. No.: 300,610

[30] Foreign Application Priority Data
June 2, 1972 Canada .................................. 143713

[52] U.S. Cl. ..................................................... 9/1 T
[51] Int. Cl. ............................................ B63c 13/00
[58] Field of Search ......... 9/1 R, 1 T; 115/1 R, 1 A, 115/1 B; 187/8.43

[56] References Cited
UNITED STATES PATENTS

| | | | |
|---|---|---|---|
| 2,850,747 | 9/1958 | Bouchard | 9/1 T |
| 3,657,751 | 4/1972 | Shaw | 9/1 R |
| 3,025,537 | 3/1962 | Rasmussen | 115/1 R |
| 3,303,520 | 2/1967 | Bachley | 9/1 T |

Primary Examiner—George E. A. Halvosa
Assistant Examiner—Charles E. Frankfort
Attorney, Agent, or Firm—Ladas, Parry, Von Gehr

[57] ABSTRACT

An amphibious vehicle includes a body and a pontoon/road wheel assembly on each side pivotally connected to the body for angular movement about an axis parallel to the length of the body between a land travelling position in which the wheels are engageable with the ground and the pontoons are in a laterally inner position, and a water travelling position in which the pontoons are in a laterally outer position. Each pontoon/road wheel assembly includes a transverse bulkhead member with pontoon portions extending forwardly and rearwardly therefrom, and each bulkhead member carries a road wheel assembly externally of the pontoon. A fluid pressure jack is connected between the body and each bulkhead member for effecting movement of each pontoon/road wheel assembly between land travelling and water travelling positions.

1 Claim, 5 Drawing Figures

PATENTED MAR 19 1974 3,797,056

AMPHIBIOUS VEHICLE

This invention relates to amphibious vehicles, for example, pleasure boats which can also be towed on land.

One type of vehicle of this nature has a pontoon/road wheel assembly on each side pivotally connected to the vehicle body for angular movement about an axis parallel to the length of the body. Each pontoon/road wheel assembly can be pivoted between a land travelling position in which the road wheel or wheels engage the ground below the body with the pontoons inboard thereof to minimize the overall width of the vehicle for land travelling, and a water travelling position in which the pontoon/road wheel assembly is pivoted outwardly to position the pontoon in a laterally outer position to provide stability during vehicle travel.

It is an object of the invention to provide an improved pontoon/road wheel assembly and mechanism for effecting the required pivotal movement.

According to the invention, each pontoon has a transverse bulkhead member with pontoon portions extending forwardly and rearwardly therefrom, the bulkhead member carrying a road wheel assembly externally of the pontoon, and a fluid pressure jack is connected between the vehicle body and the bulk head member for effecting movement of the pontoon/road wheel assembly between land travelling and water travelling positions.

Thus substantially all the forces which have to be transmitted between the vehicle body and the road wheels are transmitted through the bulkhead members, which can readily be designed to withstand such forces. The fluid pressure jacks enable the pontoon/road wheel assemblies to be easily changed from one position to another.

One embodiment of the invention will now be described by way of example, with reference to the accompanying drawings, of which:

Figure 1:
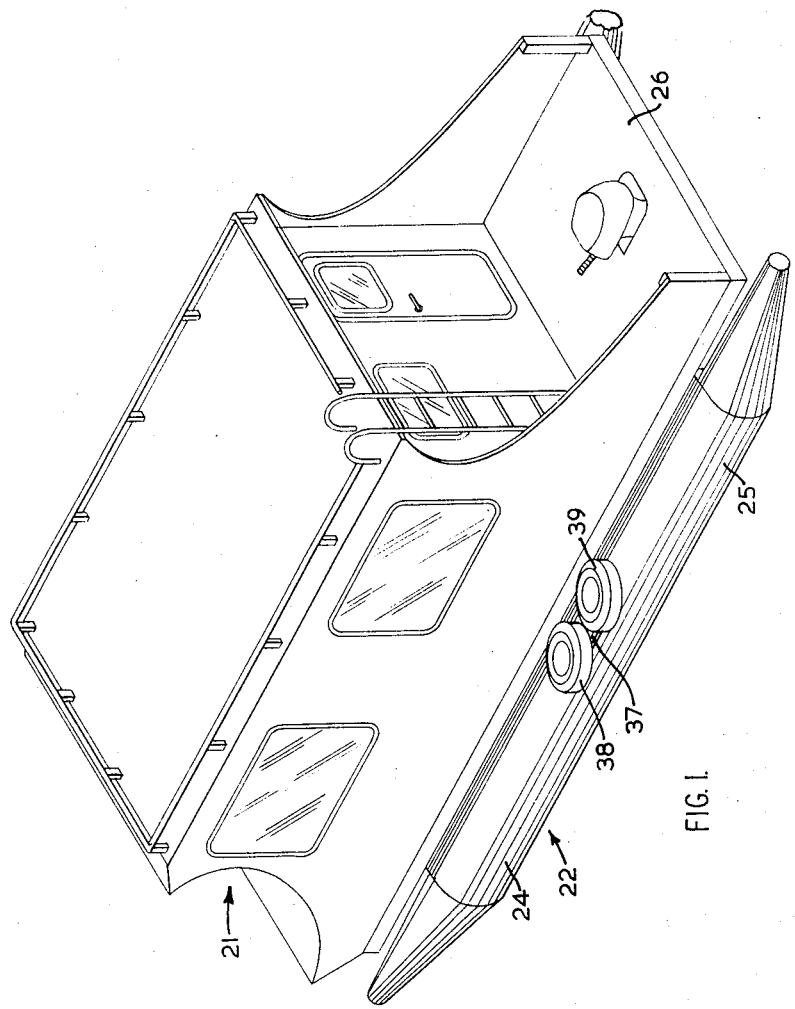
FIG. 1 is a perspective view of an amphibious pleasure boat, showing the pontoon/road wheel assemblies in the water travelling position.

Referring to the accompanying drawings, a pleasure boat which can also be towed on land has a main body 21 with two pontoon/road wheel assemblies 22 pivotally connected on opposite sides of the body 21 for angular movement about axes parallel to the length of the boat.

Each pontoon/road wheel assembly 22 includes a transverse bulkhead member 23 from which pontoon portions 24, 25 extend forwardly and rearwardly respectively. The body 21 includes a deck 26 below which are a series of tranverse deck support beams 27. Each forward pontoon portion 24 has two apertured lugs 28 which cooperate with similar lugs 29 on the ends of the beams 27 and hinge pins (not shown) in the apertures of the lugs to pivotally connect the forward pontoon portions 24 to the body 21. The rear pontoon portions 21 similarly have lugs 28 which cooperate with lugs 29 on a beam 27. Each bulkhead member 23 carries a pair of lugs 30 which are connected to lugs 31 on a support beam 27 by a hinge pin 32.

Each bulkhead member 23 is formed by longitudinally spaced, generally circular, forward and rear plates 33, 34 connected around their peripheries by a longitudinally extending web 35. The lugs 30 are extensions of the forward and rear plates 33, 34 respectively. An axle 36 extends outwardly from a lower part of a web 35 and carries a wheel mounting 37 which in turn carries forward and rear road wheels 38, 39 with a suitable suspension arrangement. The beam 27 to which each bulkhead member 23 is pivotally connected has opposite hollow ends to accommodate part of the mechanism for angularly moving the pontoon/road wheel assemblies 22. Each mechanism includes a hydraulic jack 48 pivotally connected at its laterally inner cylinder end to the beam 27 by a pin 49. The other piston rod end of the jack 48 is pivotally connected to one corner portion of a triangular lever 40 by a pin 41. Each jack 48 is powered by a hydraulic pump (not shown) on the boat. Another corner portion of the lever 40 is pivotally connected by a pin 42 to the lugs 31 below the hinge pin 32. The other corner portion of the lever 40 is pivotally connected by pin 43 to one end of a link 44 whose other end is pivotally connected by a pin 45 to two lugs 46 projecting from the web 35 above the axle 36.

Figure 5:
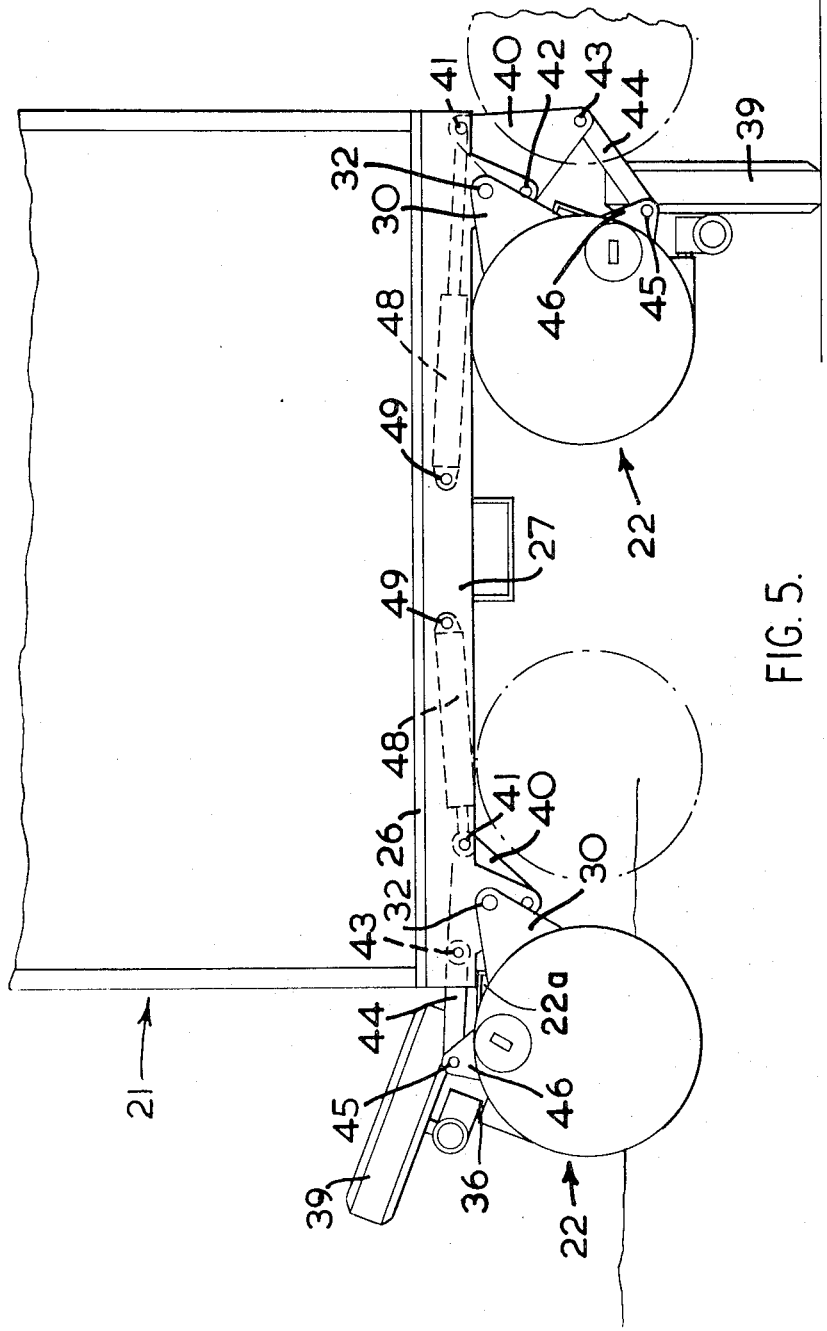
FIG. 5 is a diagrammatic transverse view showing one pontoon/road wheel assembly in the water travelling position, and the other pontoon/road wheel assembly in the land travelling position.

In the water travelling position, each jack 48 is held in its contracted condition, such that the pontoons are in their laterally outer positions, with the wheels 38, 39 uppermost, as seen in FIG. 1 and the left hand side of FIG. 5. The pontoons may be provided with appropriately shaped surfaces such as the angle members 22a shown in FIG. 5, which bear against the body 21 when in the water travelling position. This arrangement provides a relatively shallow draft, and a stable water travelling configuration.

In the land travelling position, each jack 48 is held in its extended condition, with the pontoons in laterally inner positions and with the wheels 38, 39 in engagement with the ground below the body 21, thereby reducing the width of the vehicle to a suitable value and providing a stable land travelling configuration. A detachable safety bar may be connected between the two pontoons, for land travelling, to assist in retaining them in the land travelling position.

In the land travelling position, the weight of the body 21 is supported by the wheels 38, 39 through the bulkhead members 23. The weight is transmitted from the body 21 to the bulkhead members 23 partly through the hinge pins 32 and partly by direct contact between the top of each bulkhead member 23 and the underside of the beam 27.

Thus it will be seen that substantially all the forces which have to be transmitted between the vehicle body 21 and wheels 38, 39 are transmitted by the bulkhead members 23 which can readily be designed to withstand such forces. Further, each bulkhead member 23 can form a water tight bulkhead between the forward and rear portions 24, 25 of each pontoon which provides an additional safety factor.

The hydraulic jacks 48 and associated linkages provide a suitable mechanism for easily effecting the change from the water traveling position to the land travelling position, and vice versa. In particular, it will be seen that the mechanism functions below the level of the deck, without projecting above the deck to cause an obstruction. Also, the mechanism is positioned between each wheel 38, 39 and therefore does not interfere with the wheels.

Figure 2:
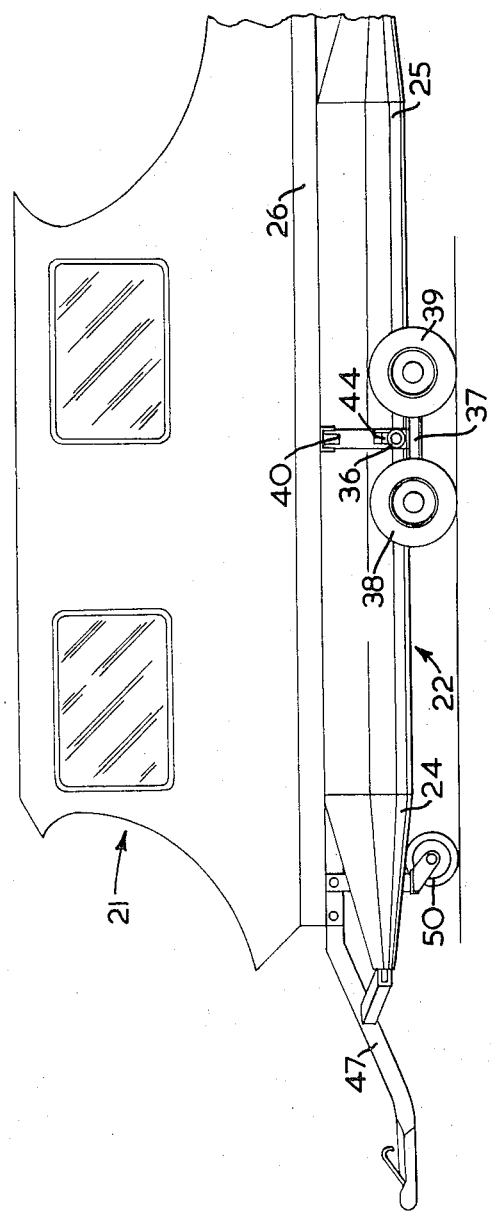
FIG. 2 is a side view of the boat showing a pontoon/road wheel assembly in the land travelling position.
Figure 3:
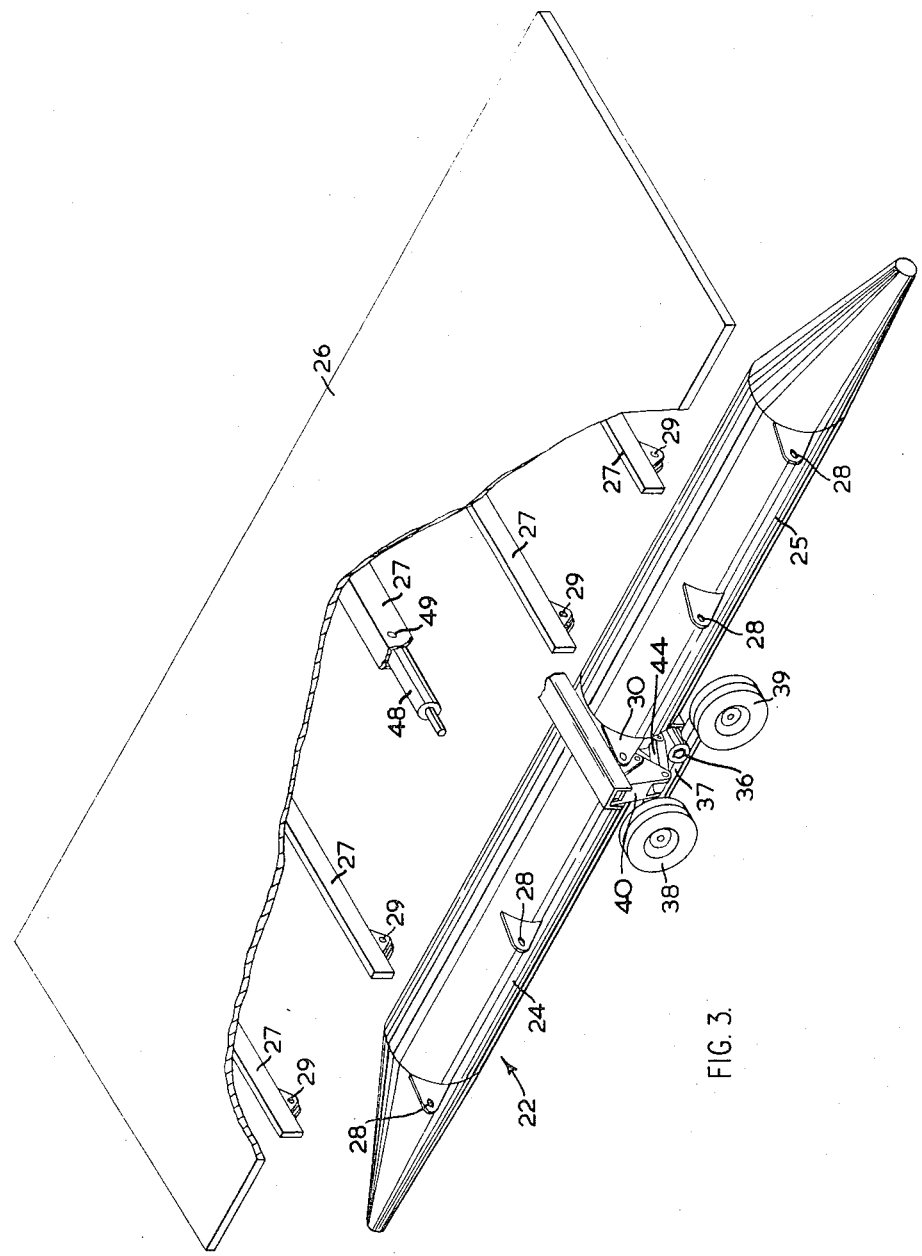
FIG. 3 is a fragmentary, perspective, exploded view of the deck structure of the boat body and a pontoon/road wheel assembly in the land travelling position.
Figure 4:
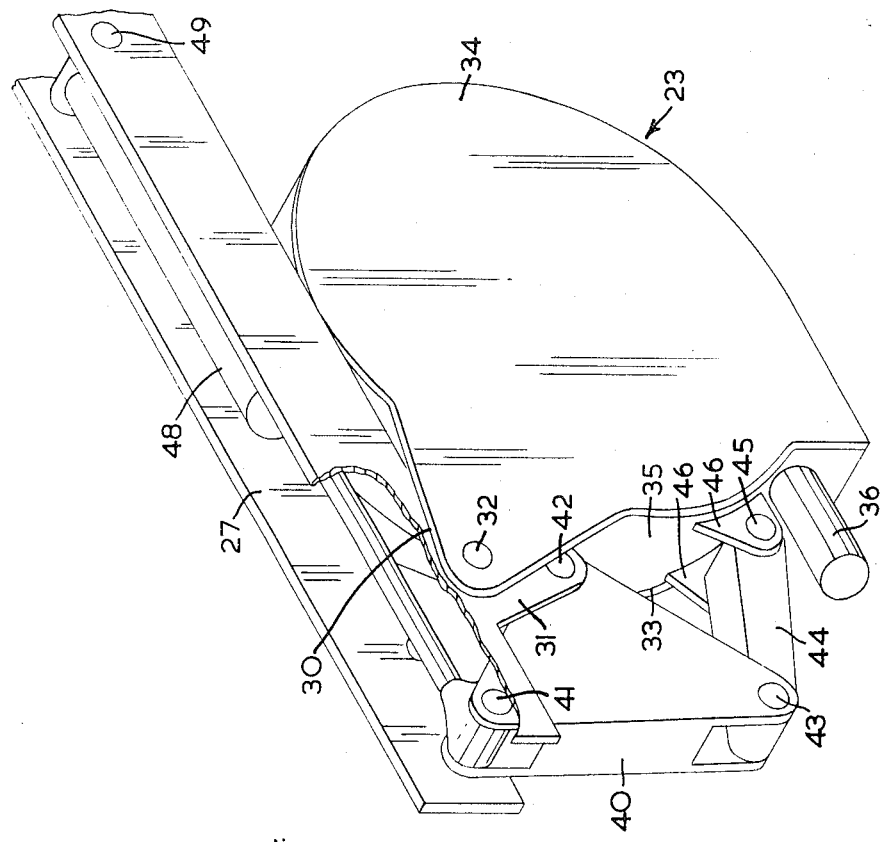
FIG. 4 is a detailed, perspective view of a deck beam, bulkhead member and operating jack.

The vehicle body 21 can be provided with a suitable tow bar 47 at its forward end, as indicated in FIG. 2, to enable the boat to be towed on land by an automobile. Also, a retractable castoring rose-wheel 50 may be provided at the forward end of the body 21 for maneuvering the boat on land. A suitable inboard or outboard motor can be carried by the body 21 for water travel, together with suitable water steering mechanism.

I claim:

1. An amphibious vehicle including a body and a pontoon/road wheel assembly on each side thereof pivotally connected to the body for angular movement about an axis parallel to the length of the body between a land travelling position in which the wheels are engageable with the ground and the pontoons are in a laterally inner position and a water travelling position in which the pontoons are in a laterally outer position, each pontoon/road wheel assembly including a transverse bulkhead member with pontoon portions extending forwardly and rearwardly therefrom, each bulkhead member carrying a road wheel assembly externally of the pontoon, the body including a transversely-extending beam, each bulkhead member being pivotally connected to the beam, the beam having opposed hollow end portions, and means for effecting movement of each pontoon/road wheel assembly between land travelling and water travelling positions, said means including a fluid pressure jack housed in each hollow end portion of the beam, each jack being pivotally connected at a laterally inner end to the beam, each jack also being pivotally connected at a laterally outer end to one corner portion of a triangular lever, another corner portion of which is pivotally connected to the beam, and a third corner portion of the triangular lever being pivotally connected to one end of a link, whose other end is pivotally connected to the bulkhead member.

* * * * *